United States Patent
Biswas et al.

(10) Patent No.: US 9,218,040 B2
(45) Date of Patent: Dec. 22, 2015

(54) SYSTEM CACHE WITH COARSE GRAIN POWER MANAGEMENT

(71) Applicant: Apple Inc., Cupertino, CA (US)

(72) Inventors: Sukalpa Biswas, Fremont, CA (US);
Shinye Shiu, Los Altos, CA (US); Rong Zhang Hu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 13/629,563

(22) Filed: Sep. 27, 2012

(65) Prior Publication Data

US 2014/0089590 A1    Mar. 27, 2014

(51) Int. Cl.
*G06F 1/32*    (2006.01)

(52) U.S. Cl.
CPC ........ *G06F 1/3225* (2013.01); *G06F 2212/601* (2013.01)

(58) Field of Classification Search
None
See application file for complete search history.

(56) References Cited

U.S. PATENT DOCUMENTS

| | | | |
|---|---|---|---|
| 5,512,921 A | 4/1996 | Mital et al. | |
| 5,961,617 A | 10/1999 | Tsang | |
| 6,848,024 B1* | 1/2005 | Rowlands et al. | 711/128 |
| 7,042,461 B2 | 5/2006 | Cui | |
| 7,127,560 B2 | 10/2006 | Cohen et al. | |
| 7,472,302 B2 | 12/2008 | Hu et al. | |
| 8,103,894 B2 | 1/2012 | Balakrishnan et al. | |
| 8,156,357 B2 | 4/2012 | Zhang et al. | |
| 8,285,936 B2 | 10/2012 | Roberts et al. | |
| 2004/0225842 A1* | 11/2004 | Rowlands et al. | 711/133 |
| 2006/0143382 A1 | 6/2006 | Damaraju et al. | |
| 2007/0288776 A1 | 12/2007 | Dement et al. | |
| 2008/0244181 A1* | 10/2008 | Walz et al. | 711/121 |
| 2008/0313482 A1 | 12/2008 | Karlapalem et al. | |
| 2010/0122100 A1 | 5/2010 | Strumper | |
| 2011/0283124 A1 | 11/2011 | Branover et al. | |
| 2012/0159074 A1 | 6/2012 | Sodhi et al. | |
| 2012/0303897 A1* | 11/2012 | Pullagoundapatti et al. | 711/118 |
| 2012/0314833 A1 | 12/2012 | Venkatasubramanian et al. | |
| 2013/0111121 A1* | 5/2013 | Ananthakrishnan et al. | 711/105 |
| 2014/0181410 A1 | 6/2014 | Kalamatianos et al. | |

OTHER PUBLICATIONS

Ke Meng and Russ Joseph, "Process Variation Aware Cache Leakage Management", Oct. 4-6, 2006 Proceedings of the 2006 international symposium on Low power electronics and design (ISLPED '06) ACM, New York, NY, USA; pp. 262-267.

Albonesi, D.H., "Selective Cache Ways: On-Demand Cache Resource Allocation", May 2000, Journal of Instruction-Level Parallelism 2 (2000) 1-6; pp. 1-22.

(Continued)

*Primary Examiner* — Gary W Cygiel
(74) *Attorney, Agent, or Firm* — Rory D. Rankin; Meyertons, Hood, Kivlin, Kowert & Goetzel, P.C.

(57) ABSTRACT

Methods and apparatuses for reducing power consumption of a system cache within a memory controller. The system cache includes multiple ways, and individual ways are powered down when cache activity is low. A maximum active way configuration register is set by software and determines the maximum number of ways which are permitted to be active. When searching for a cache line replacement candidate, a linear feedback shift register (LFSR) is used to select from the active ways. This ensures that each active way has an equal chance of getting picked for finding a replacement candidate when one or more of the ways are inactive.

22 Claims, 10 Drawing Sheets

(56) References Cited

OTHER PUBLICATIONS

Han et al.; "Using Checksum to Reduce Power Consumption of Display Systems for Low-Motion Content;" Proc. IEEE International Conference on Computer Design, Oct. 4-7, 2009, Lake Tahoe, CA; pp. 47-53.

U.S. Appl. No. 13/850,548, filed Mar. 26, 2013, entitled "Compressed Frame Writeback and Read for Display in Idle Screen on Case," inventors Brijesh Tripathi, Peter Holland, and Albert Kuo.

U.S. Appl. No. 13/890,306, filed May 9, 2013, entitled "Memory Power Savings in Idle Display Case," inventors Sukalpa Biswas, Shinye Shiu, Cyril de la Cropte de Chanterac, Manu Gulati, Pulkit Desai, and Rang Zhang Hu.

U.S. Appl. No. 13/850,565, filed Mar. 26, 2013, entitled "Mechanism to Detect Idle Screen on," inventors Brijesh Tripathi, Peter Holland, and Albert Kuo.

U.S. Appl. No. 13/866,282, filed Apr. 19, 2013, entitled "A Cache Allocation Scheme Optimized for Browsing Applications," inventor Sukalpa Biswas, Wolfgang H. Klingauf, Rong Zhang Hu, and Shinye Shiu.

U.S. Appl. No. 13/855,174, filed Apr. 2, 2013, entitled "Advanced Course-Grained Cache Power Management," inventors Shinye Shiu, Sukalpa Biswas, Wolfgang H. Klingauf, and Rong Zhang Hu.

U.S. Appl. No. 13/855,189, filed Apr. 2, 2013, entitled "Advanced Fine-Grained Cache Power Management," inventors Wolfgang H. Klingauf, Rong Zhang Hu, Sukalpa Biswas, and Shinye Shiu.

Final Office Action in U.S. Appl. No. 13/866,282, mailed Jul. 17, 2015, 18 pages.

Office Action in Taiwan Patent Application No. 103113581, mailed May 19, 2015, 15 pages.

* cited by examiner

SYSTEM CACHE WITH COARSE GRAIN POWER MANAGEMENT

BACKGROUND

1. Field of the Invention

The present invention relates generally to data caches, and in particular to methods and mechanisms for optimizing a system cache located in a memory controller.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the processor.

Conventional caches are typically coupled to or nearby a processor and store data that is frequently accessed by the processor to reduce latency. In a conventional cache, data may be retained in the cache based on the temporal locality of accesses. For example, when a line is allocated in the cache, the more times the line is referenced, the more difficult it becomes to have this line replaced. However, conventional caches are not designed for storing data that is accessed multiple times when the accesses are widely spaced in time. Such data would tend to get evicted in a traditional cache. Furthermore, making a cache larger provides higher cache hit rates during times of high demand, but also increases the power consumption of the cache itself.

SUMMARY

Systems, memory controllers, caches, and methods for reducing the power consumption of a system cache are disclosed. In a system on chip, multiple agents may be coupled to a memory controller which in turn may be coupled to one or more memory devices. The multiple agents may access the memory device(s) via the memory controller. The memory controller may include a system cache configured to store data for the purposes of reducing the number of requests that access off-chip memory.

In one embodiment, the system cache may have a multi-way set associative configuration. To reduce the power consumption of the system cache, individual ways may be powered down when the cache activity is low. The power management of the ways is dynamic and may be hardware-controlled, software-controlled, or any combination thereof. The system cache may include a configuration register which may be programmed by software, and the configuration register may include a programmable value that indicates the maximum number of ways that are permitted to be active.

The system cache may include a cache control unit, and the cache control unit may include a mechanism to detect when misses begin to outpace hits, and in response to detecting this condition, one or more ways may be powered up. The cache control unit may also use an idle timer to determine when to shut ways down.

When one or more ways are inactive, the cache control unit may utilize a linear feedback shift register (LFSR) for determining which way to search first when looking for a cache line replacement candidate. The range of the LFSR may be dependent on the number of ways that are currently active. Through the use of the LFSR, the cache control unit may select randomly from the ways that are active, and the selection may be made such that each active way has an equal probability of being selected.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
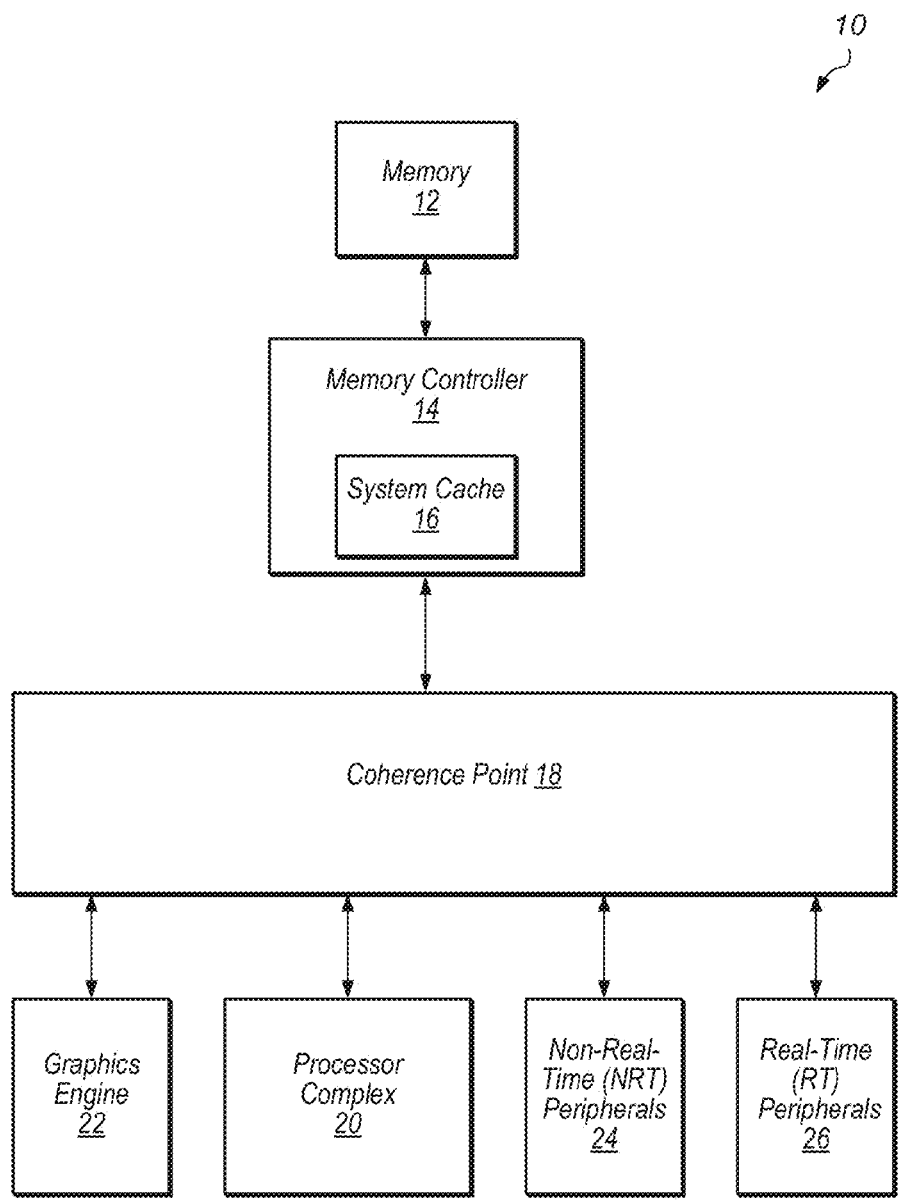
FIG. 1 illustrates one embodiment of a portion of an electronic device.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. In one embodiment, cache lines may be allocated in system cache 16 with either a sticky state or a non-sticky state. When deciding which data to retain in system cache 16, system cache 16 may base the decisions on the sticky status of the cache lines. For example, in one scenario, geometry data may be provided to processor complex 20, and this geometry data may be translated to a data structure that a 3D engine inside graphics engine 22 can understand. After the translation is performed, the 3D engine may reference the translated data structure multiple times within a single frame. Therefore, the translated data structure may be allocated in system cache 16 as sticky to ensure that the cache lines storing the data structure are not replaced in system cache 16 by other data. As a result of using the sticky allocation for data that is going to be reused, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
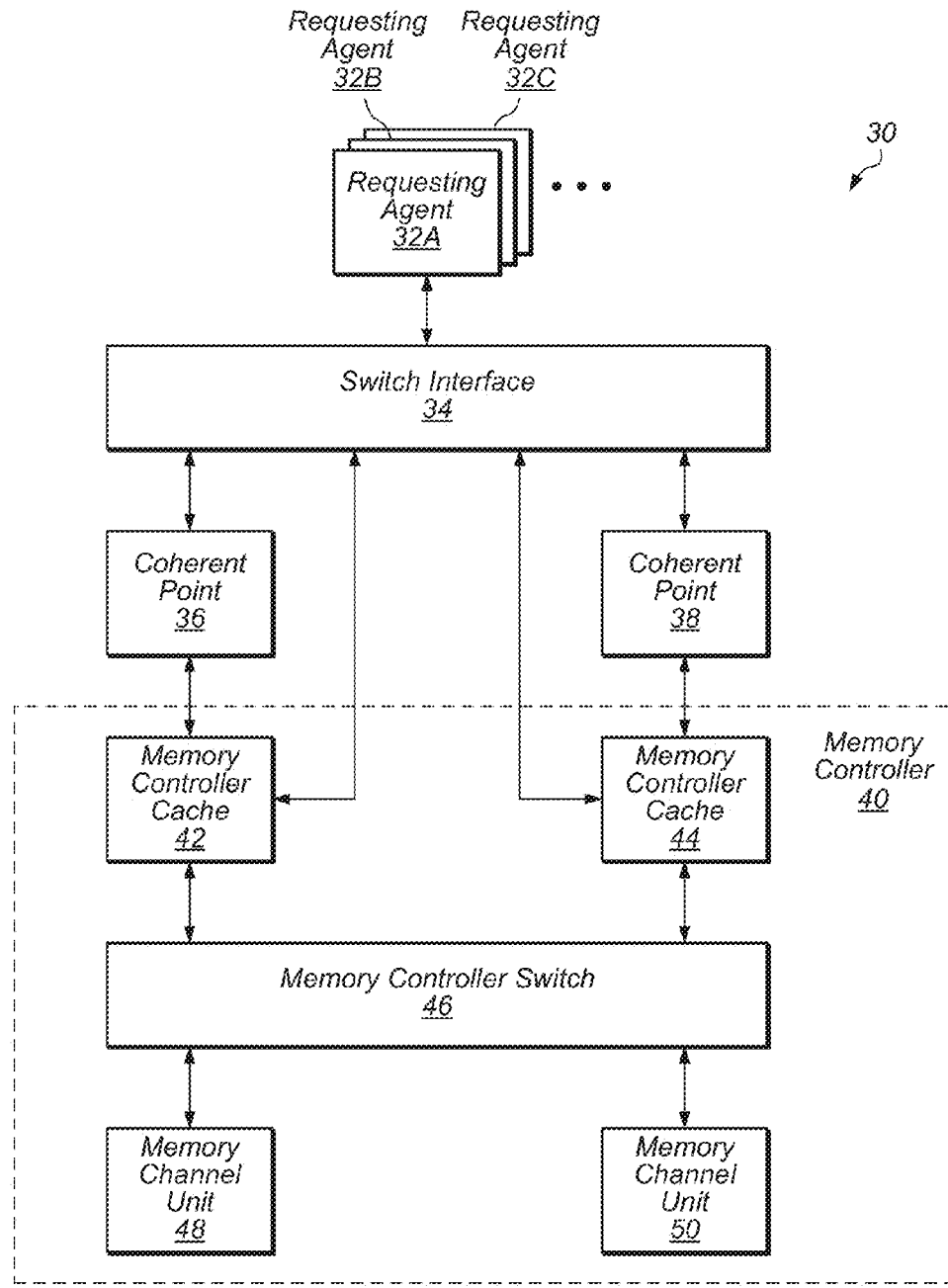
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC). It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherent point 36 and memory requests that reference the address space of cache 44 may be routed by switch interface 34 to cache 44 via coherent point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller caches 42 and 44 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field. The group ID field may be used to identify the dataflow source of the request which caused the cache line to be allocated in the cache. In one embodiment, cache lines that are allocated as sticky may be retained until the cache receives a software command to clear the sticky allocation. Each cache 42 and 44 may be configured to implement a replacement policy for existing cache lines, but the replacement policy may exclude the sticky lines from being considered for replacement. A cache line may be allocated as sticky for a request that misses in the cache if the request includes a sticky allocation hint. A requesting agent may make the determination that a specific request should have a sticky allocation hint, and the requesting agent may base the determination on whether the data referenced by the specific request is likely to be used by subsequent requests.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
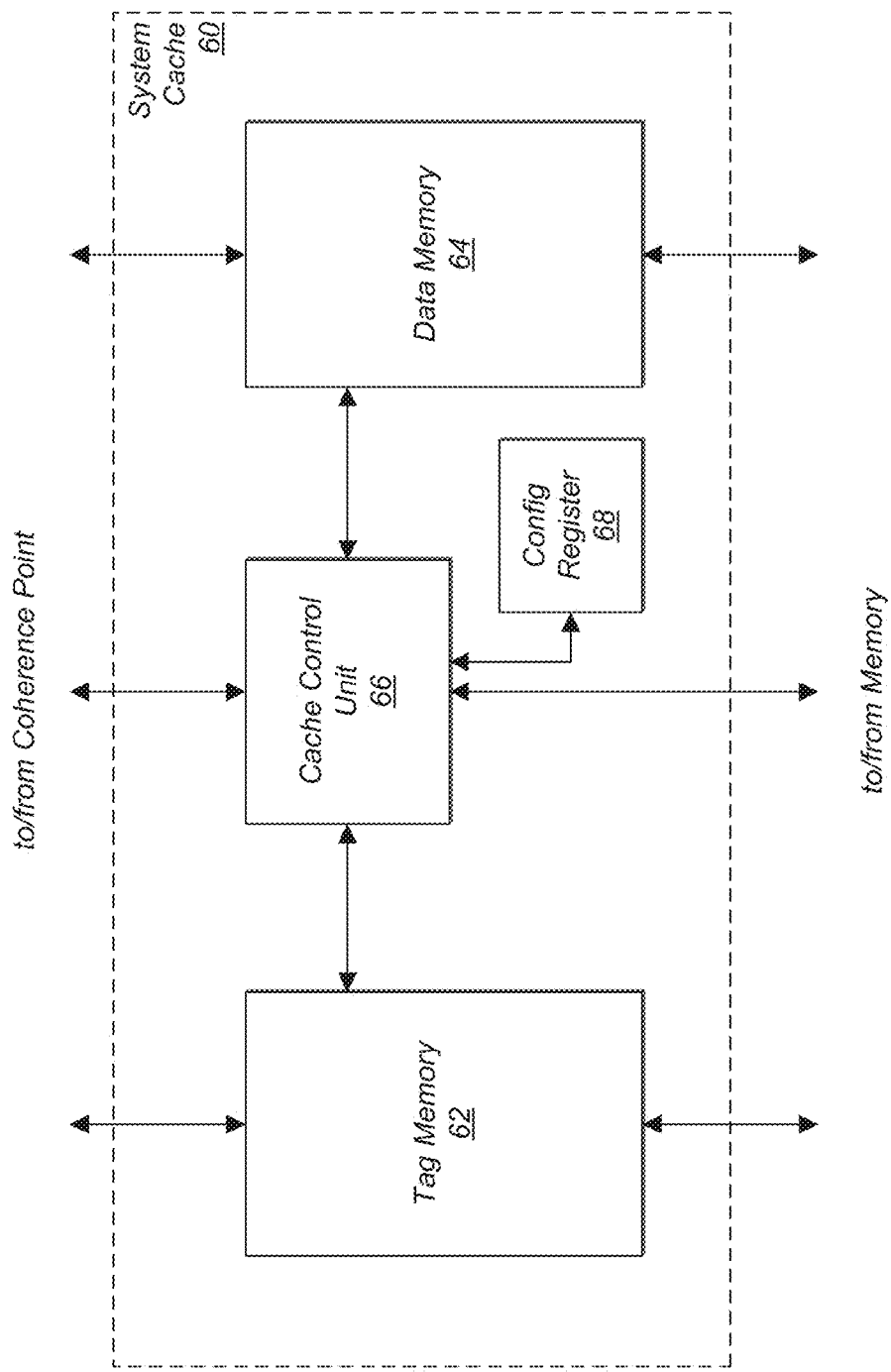
FIG. 3 is a block diagram illustrating one embodiment of a system cache.

Referring now to FIG. 3, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 3. For example, in other embodiments, system cache 60 may include arbitration circuitry to arbitrate among requests. It is to be understood that the system cache architecture shown in FIG. 3 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 3 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and clearance policy for a respective group ID. The status may be set to either active or inactive by a software command sent to system cache 60. When the status is set to inactive, this may trigger the cache control unit 66 to invalidate all of the lines that are allocated for this particular group ID. The quota may be set to limit the amount of lines that may be allocated for the respective group ID in system cache 60. In one embodiment, there may be a quota counter (not shown) for each group ID in the cache control unit 66. The quota counter may keep track of the number of cache lines in system cache 60 for the corresponding group ID. The replacement policy may specify if the given group ID can replace its own sticky lines with new sticky lines. In one embodiment, this replacement policy may be indicated using a sticky replacement configuration option indicator. This replacement policy may only be carried out if there are no available non-sticky cache line storage locations in system cache 60 for the new sticky line.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above. The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

In one embodiment, each transaction received by system cache 60 from a requesting agent may include a group ID number, a cache allocation hint, and one or more other attributes. The cache allocation hint may be utilized by system cache 60 and cache control unit 66 to determine how to allocate a cache line for the transaction if the transaction misses in the system cache 60. If a new cache line is allocated for the transaction, the group ID number may be stored in a corresponding entry in tag memory 62.

In one embodiment, cache control unit 66 may determine if there is an available entry in data memory 64 in response to receiving a sticky transaction from a requesting agent. If the transaction is sticky and a cache miss, and there is an available non-sticky entry in data memory 64, then a new sticky entry may be allocated for the transaction, replacing the available non-sticky entry. If the transaction is sticky and a cache hit to a non-sticky entry, the non-sticky entry may not be converted to sticky by this hit. In another scenario, if a non-sticky transaction hits on a sticky entry, then the sticky entry may remain sticky.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

In one embodiment, a cache line may be initially allocated for a non-sticky transaction by a particular requesting agent. The particular requesting agent for which the cache line was initially allocated may be considered the primary user of that line. Any subsequent hits by other group IDs to this entry may be considered secondary users, and therefore, the original non-sticky state may be maintained for the cache line, even if subsequent hits for the cache line are for sticky transactions.

In one embodiment, a cache line with a sticky state allocated for a first group ID may be hit by a sticky transaction for a second group ID. In this scenario, the group ID of the tag entry corresponding to the cache line may be changed to the second group ID. In other words, the second group ID may inherit the cache line from the first group ID. This mechanism for inheriting cache lines may be useful in certain graphics processing applications, when data for a previous frame may be used again for the next frame. To facilitate the reuse of this data, the ownership of the cache line may be transferred from the first group ID to the second group ID.

In some embodiments, ownership of cache lines may be transferred from a first group ID to a second group ID via a software command sent to cache control unit 66. The software command may specify that all cache lines that are assigned to the first group ID be transferred to the second group ID. This feature may prove beneficial in many applications, including graphics applications.

Figure 4:
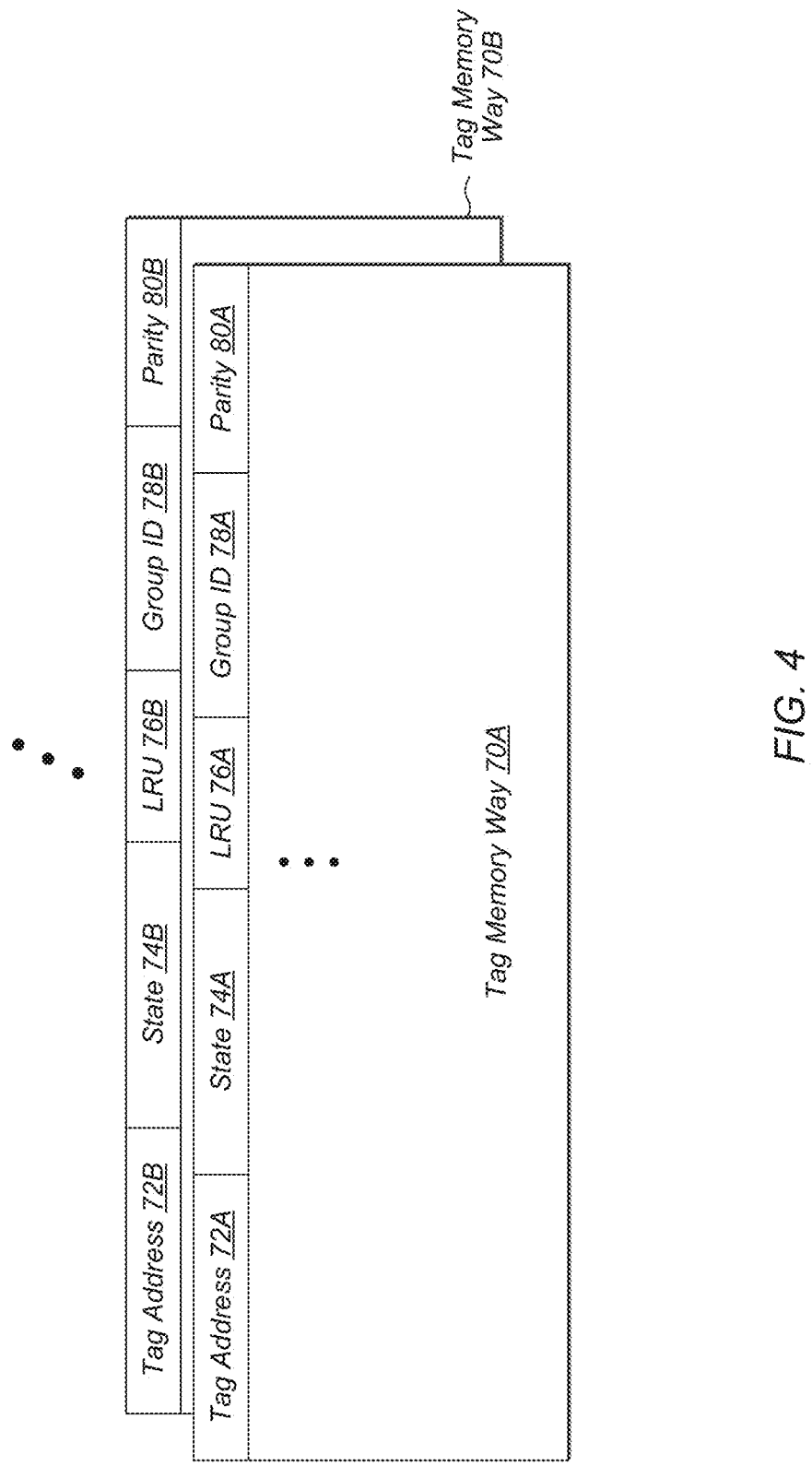
FIG. 4 is a block diagram illustrating one embodiment of a pair of tag memory ways.

Turning now to FIG. 4, a block diagram of one embodiment of a pair of tag memory ways is shown. Tag memory ways 70A-B are representative of any number of ways that may be included within a tag memory, such as tag memory 62 (of FIG. 3). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The clean/dirty status of a cache line may be conveyed along with the transaction to the system cache by the requesting agent. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The requesting agent responsible for generating the transaction may convey a hint with the transaction that determines the state that will be assigned to the corresponding tag entry. This hint may determine if the data associated with the transaction is stored in the system cache. For example, in one scenario, for a specific transaction, the hint accompanying the transaction may indicate that the transaction is sticky. If the transaction is accompanied by a sticky hint, and the transaction misses in the system cache, then the data may be retrieved from memory and allocated in the system cache with a tag state 74 set to sticky. Setting the state to sticky indicates that this data will "stick" in the cache and will not be removed by the system cache. If data for another sticky transaction from a different group ID were attempting to allocate space in the system cache, this data would be prevented from replacing sticky lines from other group IDs.

In one embodiment, the only way to remove sticky data is for the system cache to receive a software command indicating that certain sticky data for a specific group ID may be removed. In another embodiment, sticky data for a first group ID may be removed from the system cache by other sticky data from the first group ID based on the settings of a corresponding configuration register. If the setting in the configuration register for a specific group ID indicates that this group ID may replace sticky lines with other sticky lines, then a sticky line may be replaced by another sticky line for this group ID.

In some embodiments, ownership of sticky lines may be transferred from one group ID to another group ID. This transfer of ownership may be utilized in various scenarios in which data may be initially used by a first group ID and then later by a second group ID. For example, in a graphics application, certain data may be used to build one frame. A first agent using a first group ID may initially allocate data for this graphics frame. Then, a second agent using a second group ID may reuse the data for the next frame of the graphics application. The software may generate a request to transfer ownership of the frame data from the first group ID to the second group ID. The system cache may receive this software request and as a result may pass ownership from the first group to the second group while keeping the data as sticky. Also, textures that are used in a current phase of a three-dimensional (3D) graphics application may be reused for the next phase. There may be an overlap between the 3D phases, like certain boundary tiles, and these tiles may be transferred between group IDs for consecutive phases. It is noted that the transfer of ownership of cache lines between group IDs may also occur in a variety of other applications besides just graphics applications.

Allocating a line in the system cache with a sticky state will result in the line being retained in the system cache even if the amount of time in between accesses to the sticky line is large. For example, certain data may be accessed frequently, but there may be a long duration of time between accesses. This data may be placed in the system cache with the state 74 set to sticky. Therefore, the data will remain in the system cache regardless of how long the duration of time is between accesses. For example, a first cache line may be allocated as sticky in the system cache, and a length of time may elapse such that all other lines in the cache may either be replaced or accessed at least once prior to the first cache line being accessed again. If a new line needs to be allocated in the cache, the new line will take the place of one of the non-sticky lines in the cache, even if the non-sticky line has been accessed more recently than the first cache line. The first cache line may remain in the cache even if it is the least recently accessed line in the cache. This is in contrast with a traditional cache, where most recently accessed lines are retained in the cache, and the lines that have not been accessed for a long period of time are replaced.

The LRU 76A-B field may store a value indicating a usage status associated with the corresponding line. This LRU 76A-B field may indicate how recently and/or how often the corresponding line has been accessed, and the number of bits in this field may vary depending on the embodiment. The group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

Each group represented by a group ID may be assigned a specific quota of cache lines in the system cache. When a group reaches the total amount of its quota, the group may not be able to allocate any more lines in the system cache. Instead, the specific group may replace its existing lines in the cache with the newly allocated lines. In one embodiment, the first lines that are replaced for a given group ID may be the lines which have an invalid state followed by the lines which have a LRU dirty state.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 4. For example, information about how recently the cache line was replaced may also be stored in each tag of tag memory ways 70A-B. Also, in other embodiments, tag memory ways 70A-B may be structured in any other suitable manner.

Figure 5:
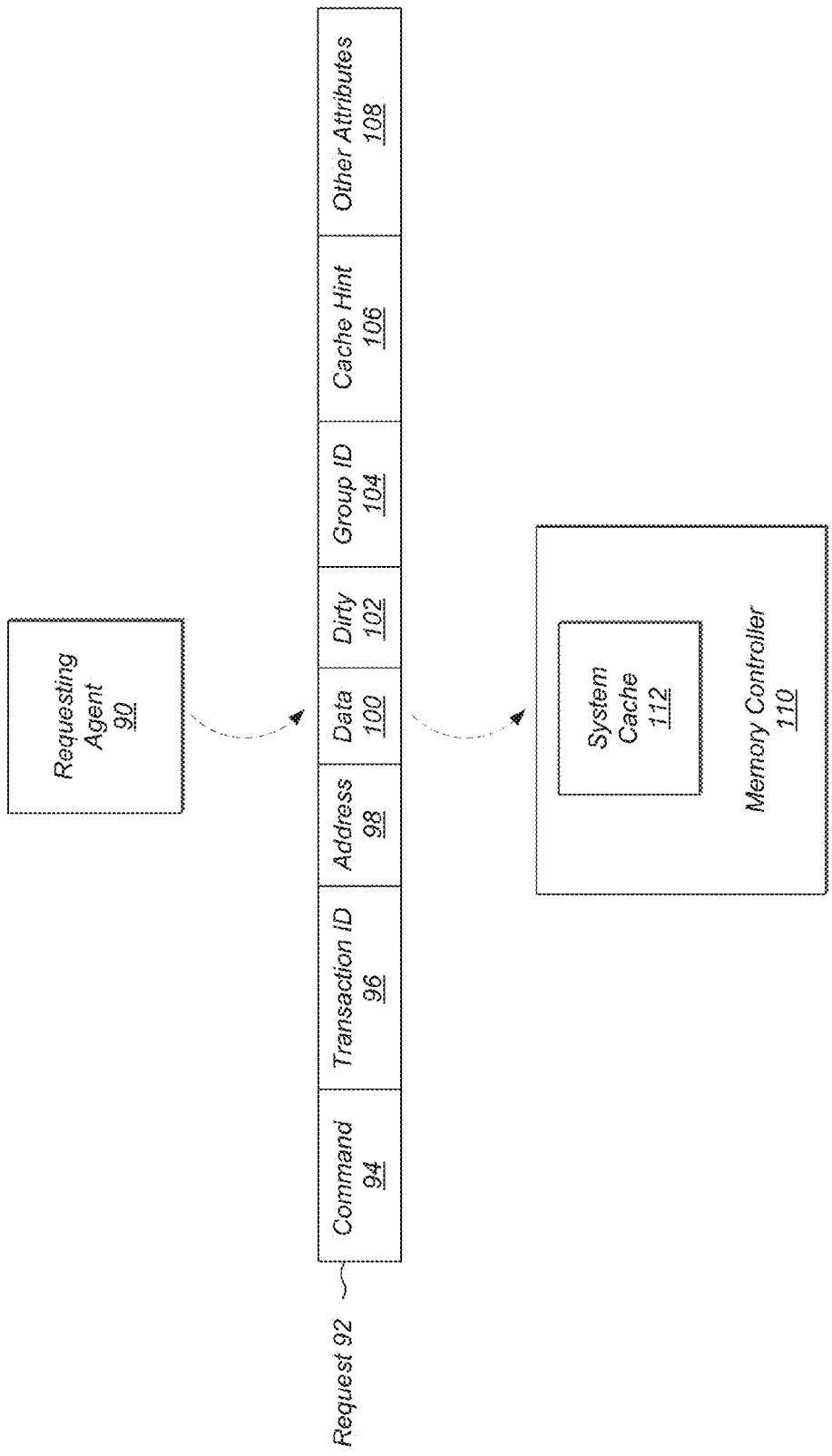
FIG. 5 illustrates one embodiment of a requesting agent conveying a request to a system cache.

Referring now to FIG. 5, one embodiment of a requesting agent conveying a request to a system cache is shown. Requesting agent 90 is representative of any number and type of requesting agents. Although requesting agent 90 is shown as sending request 92 directly to memory controller 110, it is noted that one or more components (e.g., coherent point, switch) may be located between requesting agent 90 and memory controller 110.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Cache hint 106 may determine how request 92 is treated by system cache 112. In other embodiments, cache hint 106 may be referred to as an "allocation hint", "sticky hint", "sticky flag", "sticky bit", or "sticky attribute". It is noted that cache hint 106 may indicate the sticky status of request 92 and may also include other information regarding how request 92 should be treated by system cache 112. Other attributes 108 are representative of any number and type of additional attributes (e.g., coherency, QoS attribute, size of the request, requestor ID, speculative status) which may be part of request 92. It is noted that in other embodiments, request 92 may be structured differently, with one or more additional fields not shown in FIG. 5 and/or one or more of the fields shown omitted.

Although system cache 112 is shown as a single unit, it should be understood that in other embodiments, system cache 112 may be split up into two or more separate units. For example, in another embodiment, memory controller 110 may include two channels and system cache 112 may be split up into two separate physical system caches. In this embodiment, the two separate physical system caches may be managed as one logical system cache.

Figure 6:
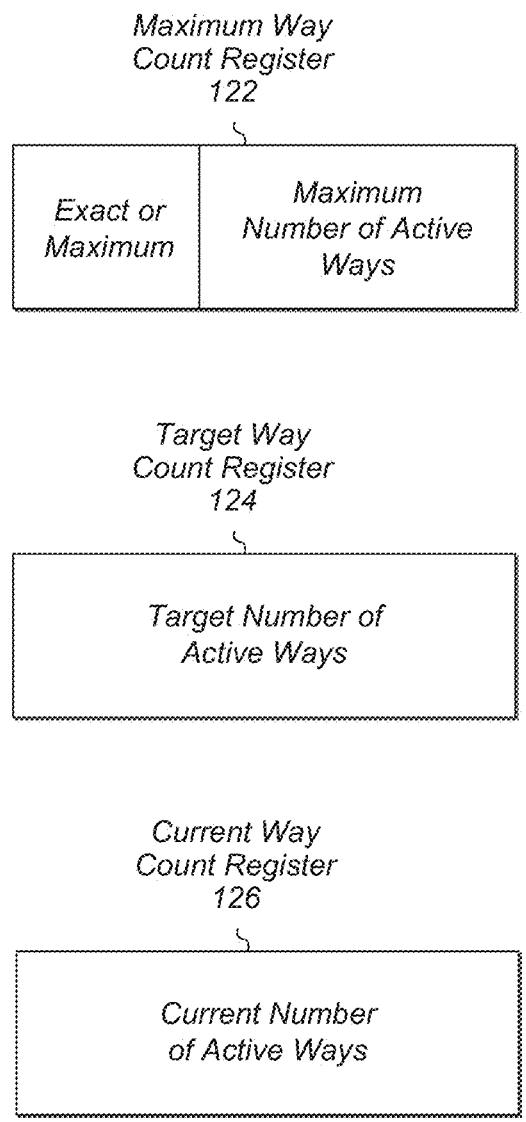
FIG. 6 illustrates one embodiment of a set of configuration registers.

Turning now to FIG. 6, one embodiment of a set of power management configuration registers for a system cache is shown. These registers may be utilized by a cache control unit (not shown) for managing the enabling and disabling of power to individual ways of a multi-way system cache.

Maximum way count register 122 may be one of the registers utilized by the cache control unit. In one embodiment, register 122 may be programmed by software commands received by the cache control unit. In one embodiment, the software commands may be generated by the operating system (OS) of the host device. Register 122 may include two separate fields. The first field may be an indicator to specify if the number of ways is an exact value or a maximum value. In one embodiment, the first field may be a single bit. The second field may specify the number of ways that are permitted to be active. The number of bits used to represent the second field may vary depending on the number of ways in the system cache. For example, in one embodiment, there may be 16 ways in the system cache, and so the second field of register 122 may have five bits. In one embodiment, software may be able to control register 122 and change the values stored in register 122 and the cache control unit may be configured to detect a change in register 122.

Target way count register 124 may also be utilized by the cache control unit for determining how to manage the power supplied to the individual ways. The value stored in register 124 may specify a target number of active ways. Register 124 may be controlled by the cache control unit, and the cache control unit may attempt to make the current number of active ways equal to the value stored in register 124. Current way count register 126 may store the current number of active ways. Registers 124 and 126 may include any number of bits, depending on the embodiment.

The cache control unit may adjust the value in target way count register 124 based on a variety of detected conditions. The value of register 122 may be written to register 124 if register 122 is in exact mode. Otherwise, if register 122 is in maximum mode, then the detection of various conditions may determine if the value in register 124 is incremented or decremented. For example, in one embodiment, if register 122 is in maximum mode, then the value stored in register 124 may be incremented if the following two conditions are detected: (1) the value in register 124 is equal to the value in register 126, (2) the value in register 124 is less than the value in register 122, and if any one or more of the following conditions are met: (1) a cache line replacement takes place because there are no more active ways, (2) an allocation fails because all of the currently active ways are sticky, or (3) an allocation fails because there is not an active way.

In various embodiments, allocation fails may be tracked or otherwise monitored on a periodic basis. For example, allocation fails within a given window of time or sampling period (e.g., 1 ms, 1 µs, or otherwise) may be monitored. In various embodiments, these sampling periods are programmable. In some embodiments, rolling averages may be determined based on multiple sampling periods. In other embodiments, cache accesses themselves during a given sampling period may be used as an indication or proxy for allocation fails where such information is not directly available. Other techniques may include monitoring bandwidth more generally as an indicator for whether cache ways should or should not be disabled. While cache allocation fails may provide a better indicator, other less accurate techniques (such as bandwidth or cache accesses) may be used when cache allocation fail information is not readily available. Numerous such embodiments are possible and are contemplated.

In one embodiment, if register 122 is in maximum mode, the target way count value stored in register 124 may be decremented if the following three conditions are detected: (1) the value in register 124 is equal to the value in register 126, (2) the value in register 126 is not zero, and (3) a system cache idle time is greater than or equal to a predetermined value (or "base idle timer") multiplied by the difference between the value in register 122 and the value in register 124. The target way count value stored in register 124 may also be decremented if the value in register 122 is less than the value in register 126. The system cache idle time may be maintained by an idle timer (not shown) that increments for every clock that the system cache is not accessed and is reset on each access. The predetermined value (or "base idle timer") may be a programmable value that is set via software. Logic within the cache control unit may maintain the idle timer and perform the necessary calculations to determine if the above conditions are met.

Figure 7:
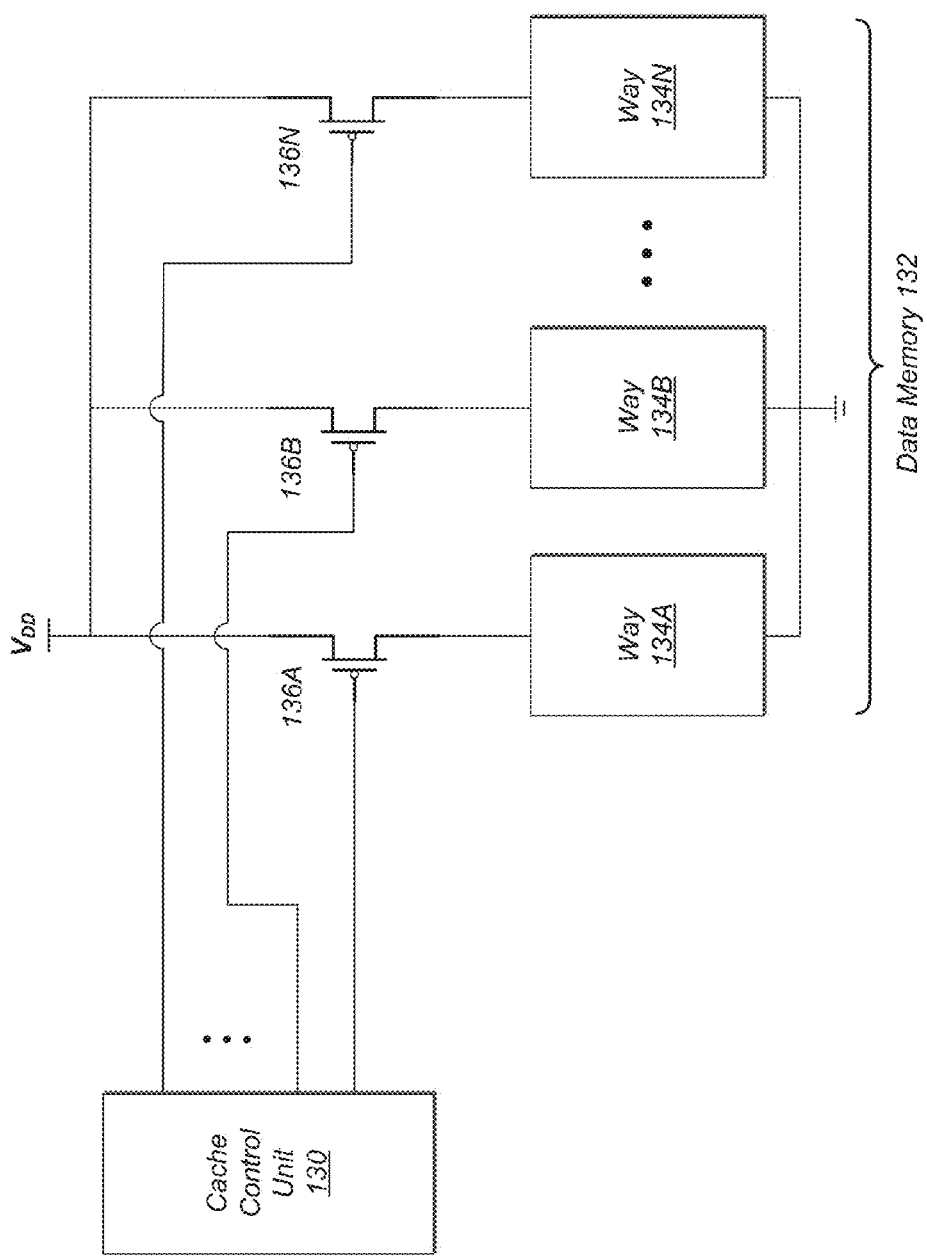
FIG. 7 is a block diagram illustrating one embodiment of a cache control unit controlling power supplies for ways of a system cache.

Referring now to FIG. 7, a block diagram of one embodiment of independently controlled power switches coupled to a system cache data memory is shown. Data memory 132 includes ways 134A, 134B, and 134N, which are representative of any number of ways of data memory 132. For example, in one embodiment, data memory 132 may include 16 ways. In other embodiments, data memory 132 may include other numbers of ways. It is also noted that in one embodiment, data memory 132 may be a static random-access memory (SRAM). In other embodiments, data memory 132 may be other types of memory.

In one embodiment, cache control unit 130 may track a cache hit rate for the system cache, and as the number of cache hits start to outpace the number of cache misses, individual ways of data memory 132 may be powered down. Cache control unit 130 may use this hardware-based approach for determining when to power down individual ways of data memory 132. Alternatively, or in addition to the hardware-based approach, a software-based approach to power management may be utilized. In this approach, the maximum way count register 122 shown in FIG. 6 may be programmed by software, and then cache control unit 130 may power up or power down individual ways based on detecting changes to register 122. In one embodiment, switches 136A, 136B, and 136N may control whether power ($V_{DD}$) is provided to ways 134A, 134B, and 134N, respectively, and each of these switches may be independently controlled by cache control unit 130.

It is noted that a tag memory (not shown) may also include multiple ways, and each way of the tag memory may be powered independently by cache control unit 130. Each way of the tag memory may store tag entries that correspond to the cache lines stored in a way of the data memory. Therefore, when a specific way of the data memory is powered down, the corresponding way of the tag memory may also be powered down by cache control unit 130.

Figure 8:
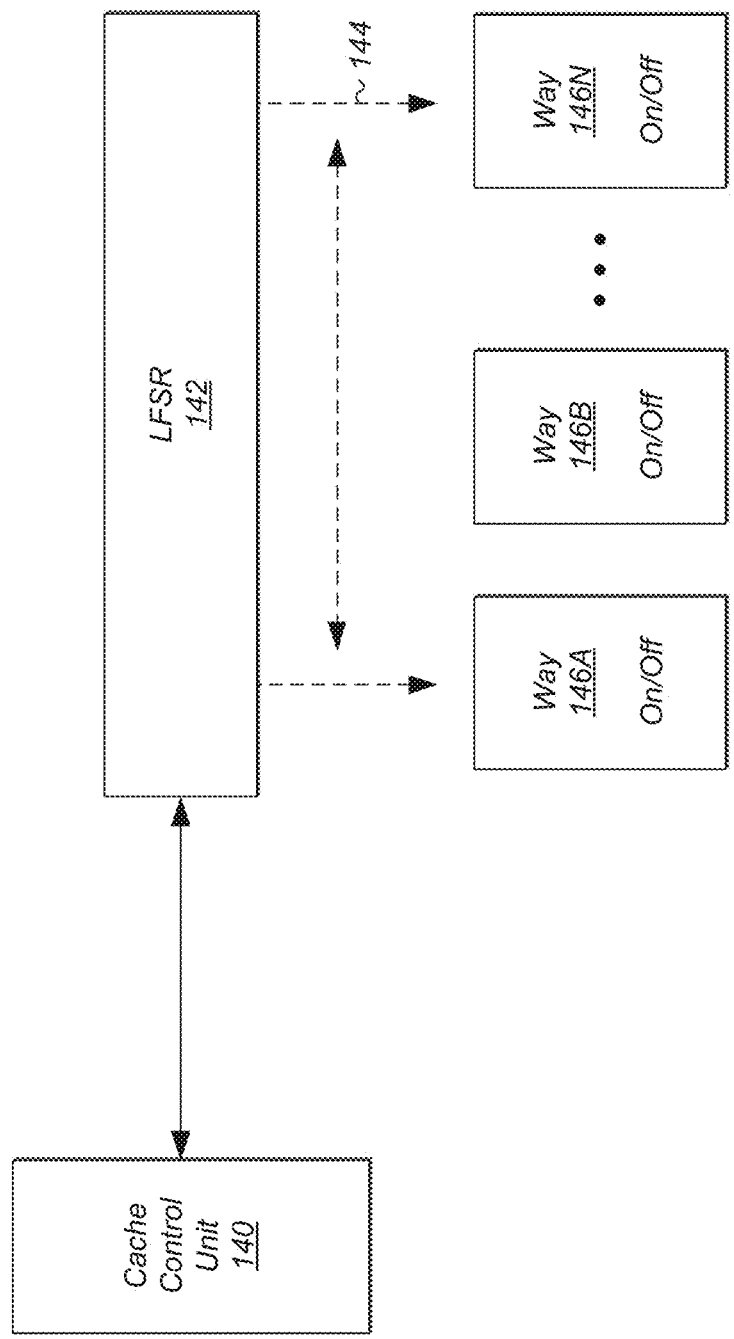
FIG. 8 is a block diagram illustrating one embodiment of a LFSR selecting a way from the active ways of a system cache.

Turning now to FIG. 8, a block diagram of one embodiment of a linear feedback shift register (LFSR) within a system cache is shown. Cache control unit 140 may utilize LFSR 142 for selecting which active way of ways 146A-N to select when searching for a location for storing a cache line corresponding to a newly received request. Although LFSR 142 is shown as a separate unit from cache control unit 140, in other embodiments, LFSR 142 may be incorporated within cache control unit 140. LFSR 142 may be any suitable type of LFSR, which is well known in the art. For example, in one embodiment, LFSR 142 may be a modular LFSR using a chain of shift registers to generate a random string of bits. This random string of bits may then be used to control the movement of search pointer 144 to one of multiple locations which will select from the active ways of ways 146A-N.

Cache control unit 140 may keep track of which ways of ways 146A-N are enabled and which ways are disabled. Ways 146A-N are representative of any number of ways of a system cache. Cache control unit 140 may convey this information to LFSR 142, and in response LFSR 142 may randomly select from only the enabled ways of 146A. For example, in one embodiment, a system cache may include 16 ways, and at a given time, only 13 of the ways may be active. Therefore, if a cache line storage location is needed, LFSR 142 may only select from the active ways, such that search pointer 144 will only land on an active way. In addition, LFSR 142 may randomly select from the active ways, such that each way has a ⅟₁₃ chance of being selected. In other embodiments, with other numbers of total ways and other numbers of active ways, the scheme may be replicated in a similar fashion with each active way having an equal chance of being selected.

Figure 9:
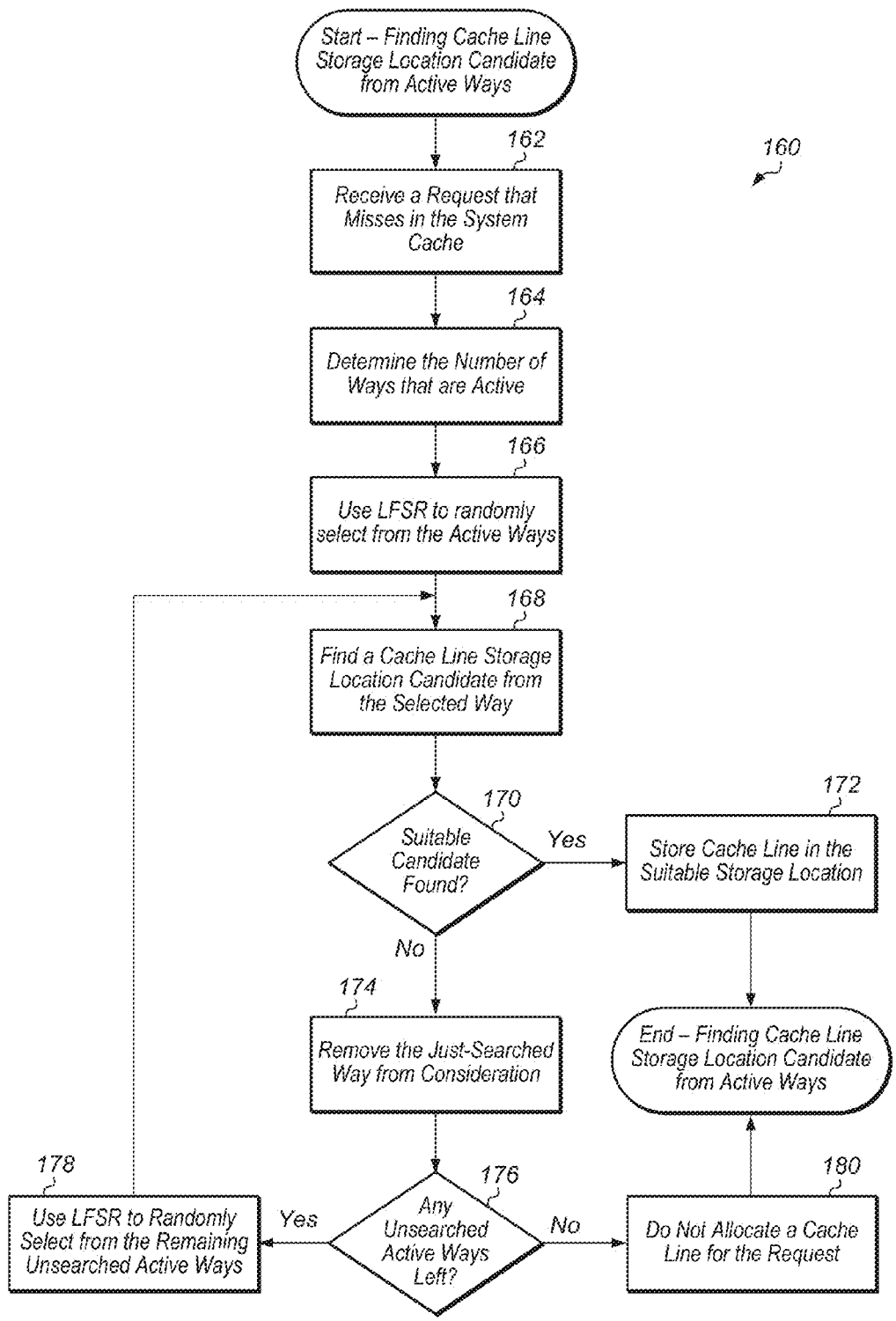
FIG. 9 is a generalized flow diagram illustrating one embodiment of a method for searching the active ways of a system cache for a cache line storage location.

Referring now to FIG. 9, one embodiment of a method 160 for finding a cache line storage location among active ways of a multi-way set associative system cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a cache miss may be detected in a system cache for a received request (block 162). In one embodiment, the system cache may have a multi-way set associative configuration. The system cache may include a cache control unit, and the cache control unit may detect the cache miss for the received request following a tag lookup. Next, the number of active ways in the system cache and the identification of these active ways may be determined (block 164). In one embodiment, a current way count register may be maintained by the cache control unit, and the current way count register may be read to determine how many ways are currently active. Also, the cache control unit may control power switches that supply power to each way, and the settings of these switches may be polled to determine the identification of the active ways.

Next, a linear feedback shift register (LFSR) may be used to randomly select from only the active ways of the system cache (block 166). The LFSR may control the location of a search pointer which may land on one of the active ways of the system cache. The range of the LFSR may be dependent on the number of ways that are currently active such that each active way has an equal chance of being selected. This ensures fairness in the selection of active ways and prevents one of the active ways from having a higher probability of being chosen over the other active ways.

After block 166, the selected way may be searched for a candidate cache line storage location to store a cache line corresponding to the received request (block 168). If a suitable candidate is found in the selected way (conditional block 170, "yes" leg), then the cache line corresponding to the received request may be stored in candidate cache line storage location (block 172). Various techniques for finding a suitable candidate may be utilized, depending on the embodiment and depending on the sticky status of the received request. For example, in one embodiment, a priority may be given to finding a non-sticky cache line storage location. After block 172, method 160 may end.

If a suitable candidate is not found in the selected way (conditional block 170, "no" leg), then this just-searched way may be removed from consideration for selection by the LFSR (block 174). In other words, this way that was just searched unsuccessfully may be treated as though it were disabled. If there are still one or more unsearched active ways remaining (conditional block 176, "yes" leg), then the LFSR may be used to randomly select from the remaining unsearched active ways (block 178). After block 178, method 160 may return to block 168 to search the selected way for a cache line storage location candidate. It is noted that if there is only one unsearched active way remaining, then block 178 may be skipped and method 160 may jump directly from conditional block 176 to block 168.

If there are no more unsearched active ways remaining (conditional block 176, "no" leg), then a cache line may not be allocated for the received request (block 180). It is noted that the if a cache line is not allocated for the received request, this may cause target way count register 124 (of FIG. 6) to be incremented if these other three conditions are met: (1) register 124 equals register 126, (2) register 124 is less than register 122, and (3) register 122 is in maximum mode. After block 180, method 160 may end.

Figure 10:
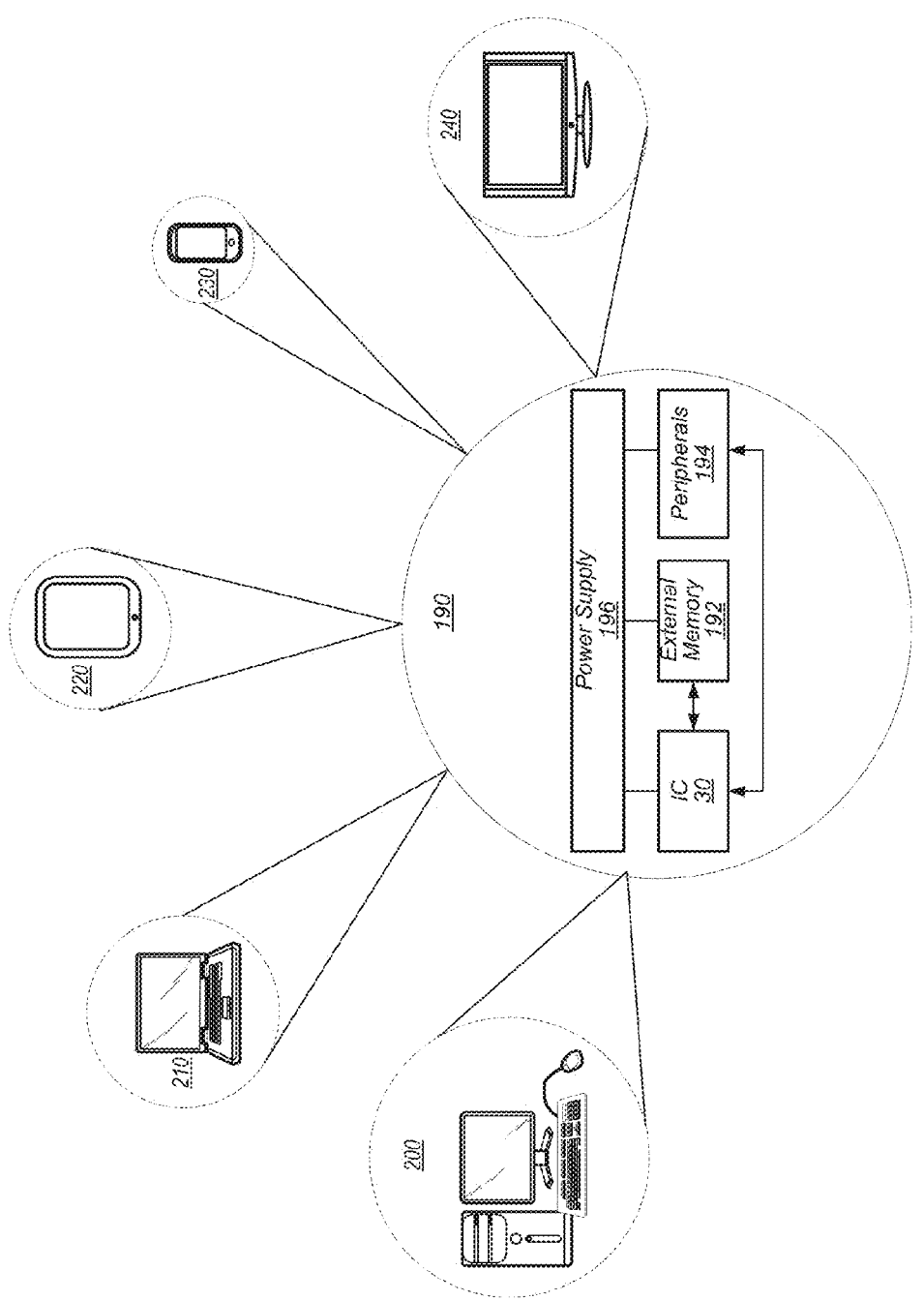
FIG. 10 is a block diagram of one embodiment of a system.

Referring next to FIG. 10, a block diagram of one embodiment of a system 190 is shown. As shown, system 190 may represent chip, circuitry, components, etc., of a desktop computer 200, laptop computer 210, tablet computer 220, cell phone 230, television 240 (or set top box configured to be coupled to a television), or otherwise. Other devices are possible and are contemplated. In the illustrated embodiment, the system 190 includes at least one instance of IC 30 (of FIG. 2) coupled to an external memory 192.

IC 30 is coupled to one or more peripherals 194 and the external memory 192. A power supply 196 is also provided which supplies the supply voltages to IC 30 as well as one or more supply voltages to the memory 192 and/or the peripherals 194. In various embodiments, power supply 196 may represent a battery (e.g., a rechargeable battery in a smart phone, laptop or tablet computer). In some embodiments, more than one instance of IC 30 may be included (and more than one external memory 192 may be included as well).

The memory 192 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 194 may include any desired circuitry, depending on the type of system 190. For example, in one embodiment, peripherals 194 may include devices for various types of wireless communication, such as wifi, Bluetooth, cellular, global positioning system, etc. The peripherals 194 may also include additional storage, including RAM storage, solid state storage, or disk storage. The peripherals 194 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache comprising:
    a cache memory arranged as a set associative memory having a plurality of ways;
    a configuration register comprising a first field and a second field, wherein the first field indicates whether an exact number of ways is specified or a maximum number of ways is specified by the second field, and wherein the second field specifies a number of ways; and
    a cache control unit coupled to the cache memory and the configuration register, wherein the cache control unit is configured to:
  manage power to the plurality of ways by dynamically enabling and disabling ways of the plurality of ways; and
  limit a number of active ways to the maximum number specified by the configuration register;
  wherein when the first field indicates an exact number of ways, a number of active ways in the cache memory is fixed at a number of ways specified by the second field; and
  wherein when the first field indicates a maximum number of ways, a number of active ways in the cache memory is permitted to vary up to a number of ways specified by the second number.

2. The cache as recited in claim 1, wherein the cache control unit is further configured to monitor an amount of idle time for the cache.

3. The cache as recited in claim 1, wherein the cache control unit is configured to increase a number of ways that are active based at least in part on detecting at least one of the following:
  a cache line replacement takes place because there are no more active ways;
  an allocation fails because all of the currently active ways are sticky; and
  an allocation fails because there is not an active way.

4. The cache as recited in claim 3, wherein the control unit is further configured to utilize a linear feedback shift register (LFSR) to select a way from the active ways when searching for a cache line replacement candidate.

5. The cache as recited in claim 4, wherein a range of the LFSR is equal to the number of active ways.

6. The cache as recited in claim 5, wherein the LFSR controls a search pointer, wherein the search pointer selects a way for locating a cache line replacement candidate.

7. The cache as recited in claim 3, wherein the cache control unit is not permitted to replace data in the cache that has a sticky status.

8. A method comprising:
  managing power for each way of a multi-way system cache;
  maintaining a configuration register comprising a first field and a second field, wherein the first field indicates whether an exact number of ways is specified or a maximum number of ways is specified by the second field, and wherein the second field specifies a number of ways;
  disabling power to one or more ways responsive to detecting one or more conditions;
  detecting a miss for a received request; and
  utilize a linear feedback shift register (LFSR) to select from only active ways of the multi-way system cache for locating a cache line replacement candidate for the received request;
  wherein when the first field indicates an exact number of ways, a number of active ways in the system cache is fixed at a number of ways specified by the second field; and
  wherein when the first field indicates a maximum number of ways, a number of active ways in the system cache is permitted to vary up to a number of ways specified by the second number.

9. The method as recited in claim 8, wherein the LFSR controls a search pointer, and wherein the search pointer only points to the active ways of the multi-way system cache.

10. The method as recited in claim 8, wherein power is enabled or disabled for each way separately from the other ways of the multi-way system cache.

11. The method as recited in claim 8, wherein the one or more conditions include an idle timer exceeding a predetermined threshold.

12. The method as recited in claim 8, wherein the one or more conditions include detecting a change to a register, wherein the register stores a value equal to a maximum number of active ways.

13. A method comprising:
  managing power for each way of a multi-way system cache, wherein each way is powered separately from the other ways;
  maintaining a configuration register comprising a first field and a second field, wherein the first field indicates whether an exact number of ways is specified or a maximum number of ways is specified by the second field, and wherein the second field specifies a number of ways; and
  disabling power to one or more ways responsive to detecting one or more conditions;
  wherein when the first field indicates an exact number of ways, a number of active ways in the system cache is fixed at a number of ways specified by the second field; and
  wherein when the first field indicates a maximum number of ways, a number of active ways in the system cache is permitted to vary up to a number of ways specified by the second number.

14. The method as recited in claim 13, wherein the one or more conditions includes a reduction in a value indicated by the configuration register, wherein the value represents a maximum number of ways that are permitted to be active.

15. The method as recited in claim 13, further comprising increasing a number of ways that are active based at least in part on detecting at least one of the following:
  a cache line replacement takes place because there are no more active ways;
  an allocation fails because all of the currently active ways are sticky; and
  an allocation fails because there is not an active way.

16. The method as recited in claim 15, further comprising selecting a way from active ways in the system cache using a linear feedback shift register (LFSR) responsive to detecting a cache miss for a received request.

17. The method as recited in claim 16, wherein the LFSR is configured to randomly select from only the active ways in the system cache.

18. The method as recited in claim 17, wherein each way of the active ways in the system cache has an equal chance of being selected by the LFSR.

19. A memory controller comprising a system cache, wherein the system cache comprises:
  a multi-way data memory configured to store a plurality of cache lines;
  a multi-way tag memory configured to store a plurality of tags corresponding to the plurality of cache lines; and
  a configuration register comprising a first field and a second field, wherein the first field indicates whether an exact number of ways is specified or a maximum number of ways is specified by the second field, and wherein the second field specifies a number of ways;
  a cache control unit configured to:
    detect a cache miss for a received request; and
    utilize a linear feedback shift register (LFSR) to select a way of the multi-way tag memory for searching for a cache line replacement candidate for the received request;

wherein when the first field indicates an exact number of ways, a number of active ways in the data memory is fixed at a number of ways specified by the second field; and wherein when the first field indicates a maximum number of ways, a number of active ways in the data memory is permitted to vary up to a number of ways specified by the second number.

20. The memory controller as recited in claim 19, wherein the cache control unit is further configured to:

supply power to each way of the multi-way tag memory, wherein each way is powered individually; and supply power to each way of the multi-way data memory, wherein each way is powered individually.

21. The memory controller as recited in claim 20, wherein each way of the multi-way tag memory corresponds to a respective way of the multi-way data memory.

22. The memory controller as recited in claim 21, wherein the cache control unit is further configured to disable power to one or more ways of the multi-way tag memory and to one or more respective ways of the multi-way data memory.

* * * * *